March 7, 1944.  J. D. RAUCH  2,343,800
VEHICLE CONSTRUCTION
Filed Oct. 25, 1941  4 Sheets-Sheet 2
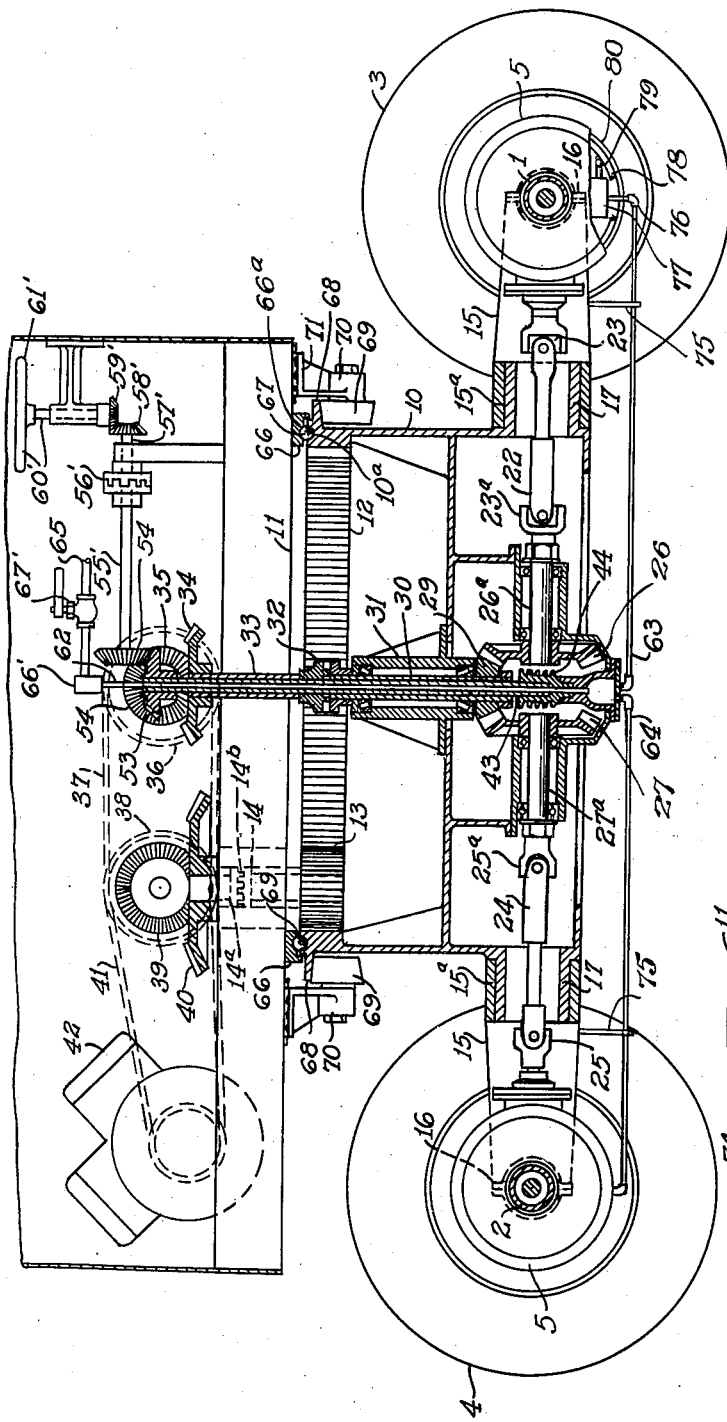
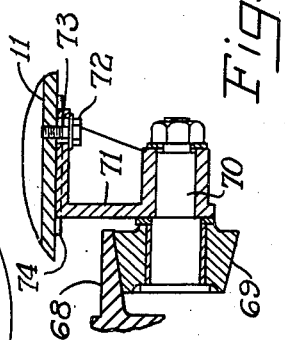
INVENTOR.
J. D. RAUCH
BY
ATTORNEY.

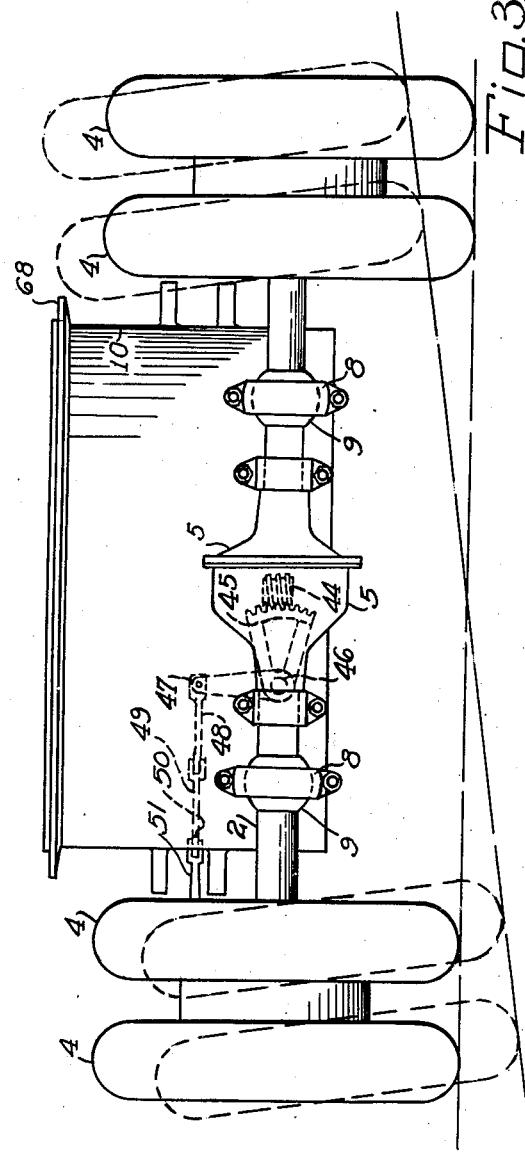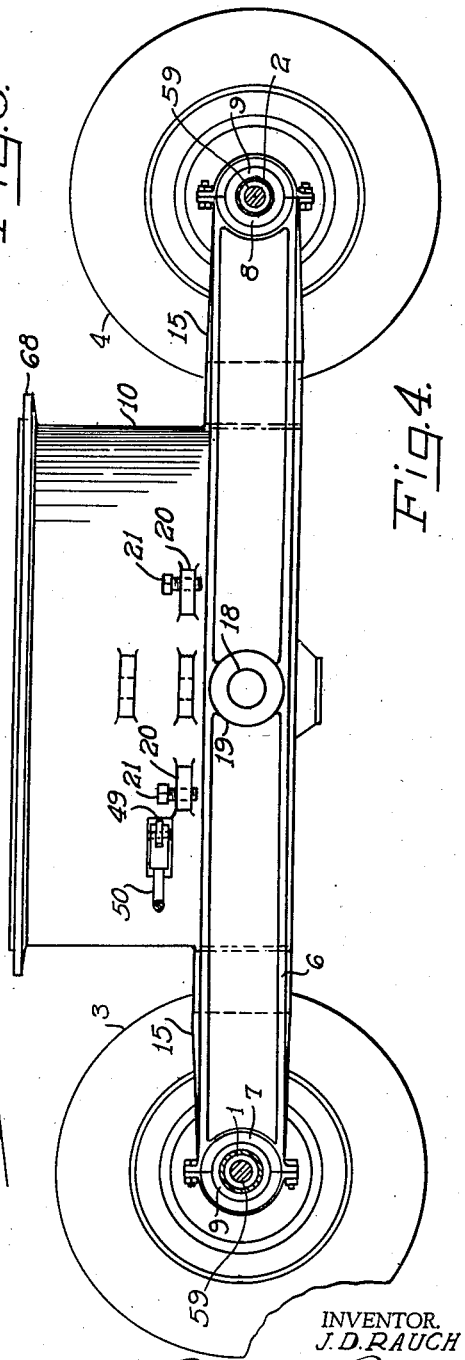

March 7, 1944.    J. D. RAUCH    2,343,800
VEHICLE CONSTRUCTION
Filed Oct. 25, 1941    4 Sheets-Sheet 4

INVENTOR.
J. D. RAUCH
BY
ATTORNEY.

Patented Mar. 7, 1944

2,343,800

UNITED STATES PATENT OFFICE 2,343,800

VEHICLE CONSTRUCTION

John D. Rauch, Lima, Ohio

Application October 25, 1941, Serial No. 416,557

16 Claims. (Cl. 180—49)

The present invention comprises a novel construction of heavy duty vehicle of the general type availing of front and rear axles upon which suitable wheels are mounted, which axles are operatively connected by frame or chassis members, the latter carrying the body, supporting member of the vehicle.

The invention is primarily adapted for use in conjunction with heavy vehicles designed for supporting the body of a large machine such as a power shovel, or the body member of the vehicle may support a heavy truck body such as commonly in use today. In fact, the vehicle of the invention may be employed for supporting revolving or other turret tank bodies as well as revolving crane bodies or the like.

A primary object of my invention has been to improve the design of vehicles wherein the front and rear axles and the supporting wheels carried thereby are directly attached to the chassis or frame members without the interposition of spring or resilient means and to make provisions whereby the axles may be permitted to cant vertically at either of opposite ends without the variation in the movement of the axles being communicated to the body supporting member of the vehicle. A further object of the invention has been to provide for the purpose last mentioned, peculiar or novel connecting means between the front and rear portions of the body supporting member and the front and rear axles respectively together with novel connecting means between the sides of the body supporting member and the chassis or frame members for maintaining the body supporting member relatively unaffected by the upward and downward canting movements of the front and rear axles at the opposite ends of the latter.

Still another object of the invention has been to provide novel driving mechanism for the front and rear axle driving shafts together with a novel arrangement of steering and braking instrumentalities as related to the vehicle frame and axle unit and to the body supporting member mounted thereon.

Another object of my invention has been to provide novel means for mounting the rotating platform of a revolving crane structure upon the supporting member of the vehicle, wherein the platform is rotatively supported upon ball bearings and adjustable hook-under rollers are provided on the platform for cooperation with a part of the supporting member for securing the platform rotatively to said member.

A preferred embodiment of my invention is illustrated in the accompanying drawings in which:

Figure 2 is a longitudinal sectional view showing largely the parts illustrated in Figure 1 and bringing out more clearly in section the drive gearing and steering mechanism, certain parts being illustrated somewhat diagrammatically since the arrangement of the latter is not material to the main features of my invention, the section being taken on the line 2—2 of Figure 1.

Figure 3 is a view in rear elevation of the chassis and supporting axle and wheel assembly, as well as the body supporting member shown in Figure 1, and dotted lines showing certain operating parts for the steering means; also dotted lines showing degrees of canting movements of the rear axles.

Figure 4 is a side elevation of my vehicle structure as shown in Figure 1, certain parts of the operating mechanism being omitted.

Figure 5 is a sectional view showing in detail the hook-under roller and bracket assembly and the manner in which the same is mounted upon the rotating platform 11.

Figure 1:
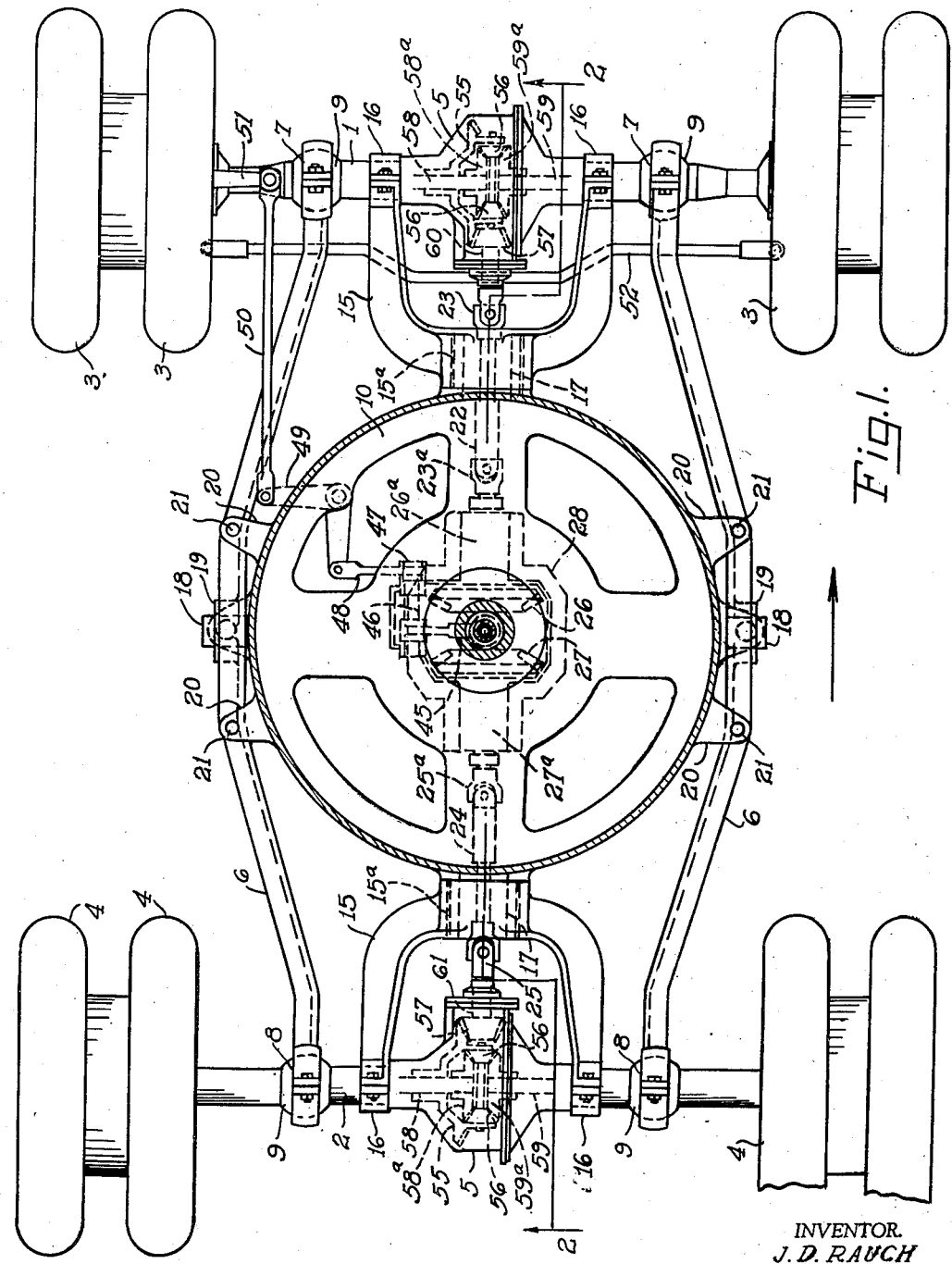
Figure 1 is a top plan view of the vehicle frame and axle assembly of my invention showing the body supporting member in place thereon and illustrating certain drive gearing transmission units and steering mechanism.
Figure 8:
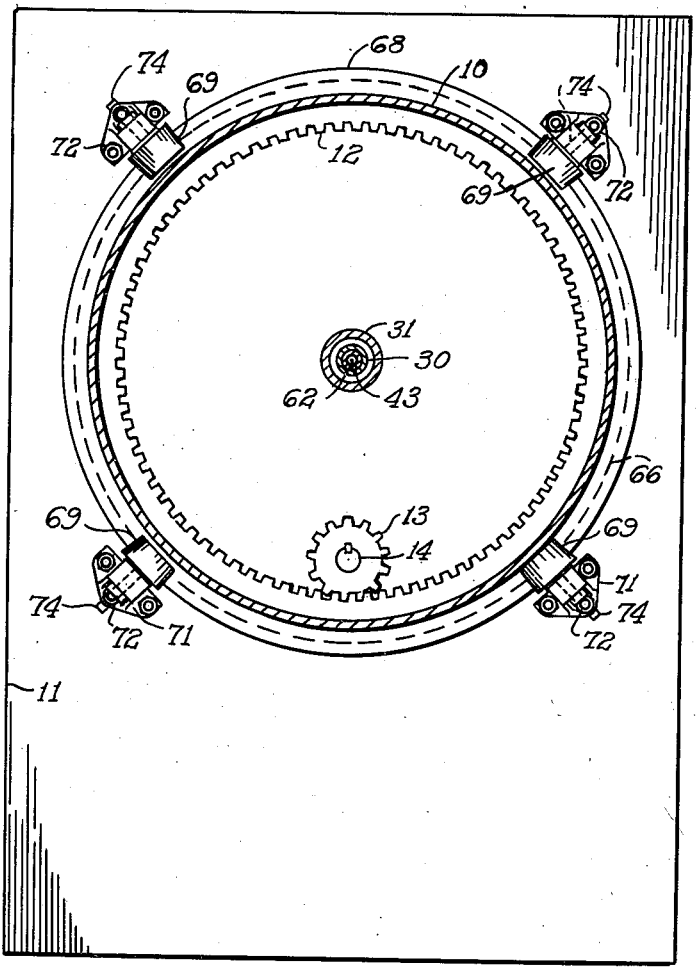
Figure 8 is a bottom reflected view of the rotating platform and a part of the body supporting member, the latter being shown in section and certain other parts in section, said view showing the disposition of the bearing means interconnecting the rotating platform with the body supporting member.
Figures 6, 7:
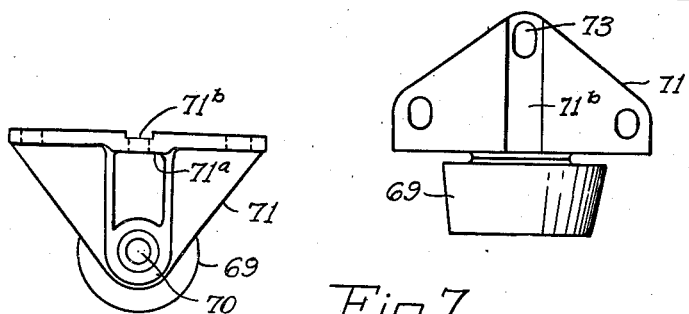
Figure 6 is an end view of parts shown in Figure 5 looking toward the left respecting Figure 5.
Figure 7 is a top view of parts shown in Figure 5.

Referring to the drawings and specifically describing the invention, it is notable that the illustration given is for an adaptation of the invention to so-called power cranes of the shovel, drag-line or clam-shell types wherein there is usually employed a revolving crane body.

The construction shown comprises the front axle 1 and rear axle 2 which may be of a conventional type including axle housings in which drive shafts are mounted for driving the front wheels 3 from the front axle unit 1 and the rear wheels 4 from the rear axle unit 2. Each of the axle units 1 and 2 is equipped with transmission gearing, as illustrated, received in the customary housings 5 of conventional construction. The front wheel unit 1 is connected with the rear wheel unit 2 by means of side frame or chassis members 6 of like form, the front ends of the members 6 being connected by ball and socket joints 7 with the axle unit 1, and the rear ends of side frame members 6 being connected to the rear axle unit 2 by similar ball and socket joints 8. The ball and socket joints are formed by split bearing portions provided at the ends of the frame members 6 and by forming the ball elements 9 on the axle housings 1 and 2. The joints 7 and 8 provide for a certain amount of universal movement intermediate the parts 6 and 1 and the parts 6 and 2.

There is provided a body supporting member 10 designed to be carried by the frame and axle and wheel assembly above described, said body supporting member according to the illustration of the drawings, being designed for carrying the rotating platform 11 of a revolving crane structure. With this purpose in mind, therefore, the supporting member 10 has a circular configuration and comprises an internal swing gear 12, in this instance designed to be stationary relatively to the platform and being engaged by the usual swing pinion 13 carried by the platform 11 and directly mounted upon the swing shaft 14 supported on the platform. The platform 11, of course, will carry the crane body or housing such as customarily employed for enclosing the crane operating mechanism by which the excavating instrumentalities of the crane are actuated, this mechanism housing including certain drum and cable equipment. Likewise the controls for the operation of driving the vehicle and steering it and for braking the wheels, will be mounted in the crane body. In certain types of revolving cranes no crane body or housing construction is required, under which conditions this feature of the vehicle of my invention may be omitted.

Likewise, it is to be understood that within the purview of the invention the body supporting member 10 need not be a gear at all but may comprise simply a suitable base structure upon which may be directly mounted a rectangular or other shaped truck body, a tank body or any other kind of super-structure such as found useful in this art. Where the tank body may comprise a revolving turret the supporting member 10 may comprise the gear structure illustrated and the swing pinion and shaft features may be used for accomplishing the revolution of the turret structure.

The mode of supporting the body supporting member 10 upon the frame and axle unit is peculiarly novel and comprises the employment of a bearing arm or yoke 15, one of which is clamped at its rear ends at 16 upon the rear axle unit 2 and thus attached directly to the housing of said unit. Said bearing arm 15 is of yoke or U form looking downwardly thereon, and is provided with a sleeve bearing 15a in which is received a rearwardly extending trunnion 17 formed on the body supporting member 10 and which operates in said bearing 15a as shown in the drawings. Now in like manner the front axle unit 1 is equipped with a rearwardly extending bearing arm or yoke 15 formed with a corresponding sleeve bearing 15a receiving the forwardly extending trunnion 17 projecting from the body supporting member 10, and the arm 15 is clamped on the axle housing of the unit 1 at 16 in the manner previously described as regards the rear bearing arm or yoke 15.

Upon the opposite sides of the body supporting member 10 are provided the outwardly projecting trunnions 18 that fit into bearings 19 formed in the side members 6 of the frame or chassis and capable of movement in said bearings. Likewise there projects from each of the opposite sides of the member 10 a pair of lugs 20 that overlie the side members 6 of the chassis or frame, said lugs having vertical set screws 21 therein mounted thereon, the lower ends of which said screws are spaced from the upper surfaces of the side members 6 but are adapted for abutment with the latter under certain conditions of service involving a rocking movement of the side members 6 in a vertical direction at the opposite ends thereof which movement may ensue as a result of the canting of the front and rear axles upwardly or downwardly at the opposite ends of the same to which the wheels 3 and 4 are mounted. In other words, the provisions above described permit a vertical rocking movement of the side members 6 in relation to the body supporting member 10 as limited however by abutment with the set screws 21 capable of variable adjustment to control the degree of such rocking movement. If desired, however, the abutment screws 21 and lugs 20 may be dispensed with, since under some conditions their use will not be necessary or desirable.

Under some conditions where the vehicle of the invention is used in a crane structure where it is desired to lift very heavy loads, it may be advantageous to adjust the set screws 21 so as to tightly engage the upper edges of the side bars 6 to prevent pivoting movement of the side bars relative to the supporting member 10 during the time of such lifting operation. In other words, under the condition just described the vehicle would be stationary and regardless of the positioning of the side bars and axles relative to the supporting member 10, depending upon the regularity or irregularity of the terrain on which the vehicle is standing, by screwing the set screws 21 into tight engagement with the side bars 6, the running gear comprising the axle and wheel units and side bars would thereby be maintained rigid relative to the supporting member 10 so that the latter would not yield or flex in any way relative to the running gear by reason of the overbalancing effect upon the body supporting member due to the lifting operation.

With the foregoing description of the parts of my vehicle structure thus far set forth, it will be evident that the mounting of the body supporting member 10, and of course the portions of the super-structure of the vehicle which are carried thereby, is such, in relation to the supporting wheels 3 and 4, axle units 1 and 2 and side frame members 6, that a downward canting movement of the axle units vertically will be permitted to a certain degree without affecting the support of the body supporting member 10 owing to the flexibility of the frame and axle assembly connections and the mode of attachment of the body supporting member 10 in relation thereto.

The mounting means by which the body supporting member 10 is carried on the vehicle frame and axle and wheel assembly as above described are advantageously employed for the purpose of enabling utilization in this type of construction of standard axle and wheel assembly units in which the transmission gearing and the output drive shafts therefrom to the wheels are all housed within the axle so as to be disposed substantially at the axial center of the axle.

By availing of the peculiar mounting means of my invention (enabling use of the aforesaid standard type of axle), the driving shafts, intermediate the driving mechanism on the body supporting member and the transmission gearing for the respective front and rear wheel units, are enabled to be disposed on a common axis extending longitudinally of the vehicle and intersecting the axes of the wheels and differential output driving shafts therefor of each of the respective front and rear axle units.

One particular advantage of this construction is that canting movement of the front and rear wheels or axles relative to the body supporting member will not distort the driving connections between the differential gearing of the wheel units and the driving mechanism of the body supporting member during such canting movement of the axles. Thus the driving connections between the differential gearing and the drive mechanism on the body supporting member are enabled to operate more efficiently than would otherwise be the case were they subject to distortion out of normal alinement.

The transmission gearing will comprise the usual differential gear units, generally designated at 5 in the drawings, commonly employed in this art and customarily used on the rear axles only of vehicles. This differential gearing may comprise the bevel gears 55 meshing with the bevel pinions 57. The bevel gears 55 carry bevel pinions 56 meshing with bevel pinions 58a and 59a provided on the output shafts 58 and 59. The bevel pinions 57 are provided on the differential input shaft sections 60 and 61 for the front and rear axle and wheel units respectively.

The differential gears of the gear transmission units 5 are arranged so that the input driving shaft connections therewith are on the longitudinal axis of the vehicle and coaxial with the bearing 15a and trunnions 17 of the bearing arms 15. The said driving shaft means for the input shaft sections of the differential gear units comprise the forwardly extending shaft sections 22 including suitable universal joint parts 23 by which the shaft section 22 is connected to shaft section 60, and similar rearwardly extending shaft sections 24 and universal joints 25 by which shaft section 24 is connected to shaft section 61. The shaft section 22 is driven by a bevel gear 26 and the shaft section 24 by a bevel gear 27, arranged in a suitable gear housing 28 carried by the body supporting member 10. The gears 26 and 27 are directly supported by shaft sections 26a and 27a respectively mounted in suitable bearings in the housing 28 and having universal connection by the joints 23a and 25a with the shaft sections 22 and 24 respectively.

The bevel gears 26 and 27 are operated by a bevel pinion 29 carried by a vertical drive shaft 30 mounted in a suitable bearing structure 31 carried by the supporting member 10. In turn, by the use of a suitable clutch 32 the shaft 30 is adapted to be driven by an upper shaft 33 which is operated by a bevel gear 34 meshing with a bevel gear 35 driven by a sprocket gear 36. The sprocket gear 36 is operated by a sprocket chain 37 as one simple, conventional means of actuation thereof, and the sprocket chain 37 extends from the gear 36 to another sprocket gear 38. The sprocket gear 38 operates a bevel gear 39 meshing with a bevel gear 40 on shaft section 14a which is adapted to be operatively connected, by means of a suitable clutch 14b, to the swing shaft 14 previously described as carrying the swing pinion 13 that cooperates with the swing gear 12.

The sprocket gear 38 is driven by a sprocket chain 41 connected for operation from the prime mover such as a gas or Diesel engine 42 or any suitable motor. The driving connections described are not such as I intend to be restricted to because they are merely exemplary of what may be used. By operating the clutch member 32 the drive from the engine or motor 42 may be transmitted to the transmission gear units 5 and the axle shafts and wheels of the front and rear axle units 1 and 2 respectively.

The steering mechanism provided comprises a vertical steering shaft 43 which is mounted in the shafts 30 and 33, the latter being hollow for this purpose and said shaft 43 carries at its lower end a worm 44 that meshes with a toothed sector 45 on a shaft 46. Said sector 45 may thus be rocked by rotation of the shaft 43 and worm 44 and on the shaft 46 is an arm 47 connected by a link 48 to a bell crank lever 49. In turn the bell crank lever 49 is connected by the steering link 50 attached to the steering arm 51 of the left front wheel unit comprising the wheels 3. In this manner the said left wheel may be turned in either direction by the operation of the shaft 43 and said left front wheel unit is connected by a drag link 52 with the right front wheel unit to effect simultaneous turning of the wheels in the customary way for steering purposes.

The steering shaft 43 first referred to as a part of the steering mechanism is operated by the provision of a bevel gear 53 at its upper end meshing with a bevel gear 54 on an actuating shaft 55'. The shaft 55' is connected by clutch means 56' with a shaft 57' connected by gears 58' and 59' to the steering wheel shaft 60'. Turning of the shaft 60' in opposite directions by the wheel 61' controls proper steering movement of the front wheel units comprising the wheels 3.

It is to be understood that my invention may be availed of by utilizing only one of the bearing arms 15 and the bearing connections therebetween and the body supporting member 10, in lieu of the companion units composed of such parts as illustrated in the figures of the drawings. However, the greatest flexibility of the connection between the body member 10, side frame members 6 and front and rear axle and wheel units is obtained by employing the companion units comprising the parts 15a, 15 and 17 as set forth.

As seen in Figure 2, the worm operating shaft 43 by which the steering operation is controlled is of hollow construction and so designed in order to enable a brake instrumentality in the form of a fluid conduit 62 to pass therethrough. This fluid conduit is designed to supply a pressure fluid such as air or oil to brakes carried by the wheels 3 and 4 so that braking operations may be accomplished. The specific brake means may be of the hydraulic type and forms no part of the present invention, which involves only the construction of the shaft 43 to enable the passage therethrough of the fluid conduit 62 for the purposes mentioned. Of course, branch conduits (such as 63, 64) will lead from the conduit 62 to the various brake appliances at the wheels 3 and 4.

A conduit 65 may be swivelly connected, as at 66', at the upper end of conduit 62 so as to communicate therewith. The conduit 65 may be provided with a valve 67' and leads to a pressure cylinder, or to a pressure tank, for operating the pressure in the conduits 65, 62 and controlled by suitable operating means such as a foot pedal, or the like, convenient to the operator's position, enabled to be so located regardless of the rotation of the crane body, by reason of said swivel connection 66.

It is notable that the vertical drive shafts 30 and 33 together with their interconnecting clutch 32 are located at the axis of rotation of the revolving platform 11 relative to the supporting member 10. Likewise, it is notable that the steering shaft 43 is a vertical shaft; that the conduit 62 is vertically positioned; and that the shaft 43 and the conduit 62 are also both located at the axis of rotation of the platform 11 relative to the supporting member 10.

The drive shafts 30 and 33 which are operatively connected by the clutch 32 together comprise means for operatively interconnecting the drive mechanism carried by the revolving platform 11 with the drive mechanism carried by the supporting member 10 for driving the wheels 3 and 4 of the axle and wheel units 1 and 2. The steering shaft 43 comprises means interconnecting the steering control instrumentalities located on the revolving platform 11 with the steering instrumentalities carried by the body supporting member 10. The conduit 62 constitutes means for operatively interconnecting the brake control means carried by the revolving platform 11 with the brake instrumentalities carried by the supporting member 10. The various interconnecting means namely, the drive shafts 30 and 33, steering shaft 43, and the conduit 62 are all coaxial.

The vertical coaxial arrangement of these driving, steering, and braking interconnecting means so that they all pass through the center of rotation of the rotating platform 11 relative to the body supporting member 10 and arranged so that one is housed within the other is peculiarly advantageous in reference to its efficiency and simplicity, as will be apparent to those skilled in the art, familiar with the problem involved in interconnecting the various instrumentalities carried by the rotating crane body and those carried by the chassis or supporting member therefor so that they will not be interfered with by reason of rotation of the revolving body respecting the relatively stationary supporting structure or chassis therefor.

For a full understanding of the operation of my invention with respect primarily to the mode of flexing of the frame construction and front and rear axle assembly units, relatively to the body supporting member 10, certain specific actions may be described as typical. Suppose the vehicle is moving forward in the direction of the arrow A of Figure 1, and the left rear wheels 4 meet a rise in the surface level and pass thereover; the rear wheel unit 2 will cant upwardly at the left end. Raising movement of the left rear wheels 4 in passing over the rise in the surface level will cause the rear axle 2 to rise at its left end, and will also cause the left side frame member 6 to rise at its rear end. Coincidentally there will be a substantially relative universal movement between the rear axle 2 and the rear end portion of the left side frame member 6 by reason of the ball and socket connection 8 at the rear extremity of the member 6. At the same time there will be a certain amount of relative movement between the rear axle 2 and the right side frame member 6 by reason of the ball and socket connection 8 at the rear extremity of said latter side member 6. There will also be a certain amount of relative movement between the left side member 6 and the front axle 1 by reason of the ball and socket connection 7 at the front extremity of said latter side member 6. Coincidentally also the raising movement of the left rear wheels 4 will cause pivotal movement of the left side frame member 6 about the axis 18 and pivotal movement of the rear axle 2 and bearing arm or yoke 15 about the axis of the rear trunnion 17.

It will be apparent that by reason of the provisions for relative movement of the side frames respecting the axles 1 and 2 and the pivotal connections between the side frames and the member 10 and between the axles and the member 10, the disposition of the member 10 will be affected to a substantially less degree as a result of the raising movement of the left rear wheels as above described than would otherwise be the case without the foregoing provisions. It will be understood that a similar action of the axles 1 or 2 and one or the other of the side frame 6 will ensue when the wheels at either end of either axle are caused to meet a rise or a depression in the surface level which is not concurrently met by the other wheels of the vehicle.

It will also be understood that under a condition where the wheels at diagonally opposite corners of the vehicle, as for instance the left rear wheels 4 and the right front wheels 3 are caused to be raised in substantially the same degree and at the same time the other diagonally opposite wheels, namely the right rear wheels and the left front wheels, are caused to be lowered in substantially the same degree, the disposition of the body member 10 will not be affected at all until the lowering and raising movement of the diagonally opposed wheels causes impingement of the side frames 6 with the limiting screws 21 on the lugs 20 carried at the opposite sides of the member 10. The foregoing is cited to illustrate the flexibility of the chassis construction herein described.

It is to be understood that for all practical purposes the transversely arranged bearing means intermediate the body supporting member 10 and the side frame members 6 constitute pivotal connections between said parts. Likewise, the bearing means between the front and rear portions of the body supporting member 10 and the bearing arms or yokes 14 constitute pivotal connecting means disposed at the longitudinal axis of the vehicle and thus pivotally connecting the body supporting member 10 with the front and rear axle assemblies, as described. Furthermore, the longitudinal drive shaft means carried by the body supporting member 10 and leading to the differential gearing in the front and rear axle assemblies are coaxial with the bearings intermediate the front and rear bearing arms and said member 10.

It is worthy of particular notice that by reason of the peculiar mounting means of my invention the body supporting member 10 is firmly supported at both the front and rear relative to the axle and wheel units 1 and 2. In other words, the axle housings of the axles 1 and 2 cannot rotate on the axes of the wheels 3 and 4 relative to the supporting member 10 by reason of the supporting effect of the bearing arms or yokes 15, which are rigidly connected to the axles 1 and 2, in supporting the body supporting member 10 at the front and rear thereof relative to said axles 1 and 2. However, even though the body member 10 is thus firmly supported at the front and rear relative to the axles 1 and 2, said axles may nevertheless cant or rotate relatively to the body supporting member 10 on the axis of the trunnions 17 by reason of the swivel connection of the bearing arms or yokes 15 with the body supporting member 10, since the trunnions 17 are journaled in the sleeve bearings 15a.

It is also worthy of note that the common pivotal axis of the trunnions 17 and the sleeve bearings 15a extends longitudinally of the vehicle and preferably I arrange the bearing arms 15 and the trunnions 17 in such a manner that the common pivotal axis just mentioned passes through the axial center of both the front and rear axles. More particularly stated, I preferably arrange the bearing members 15 and trunnions 17 so that their common pivotal axis intersects the axes of the differential output shafts 58 and 59 of both the front and rear axles 1 and 2. It may also be noted that the wheels 3 rotate on an axis common to the axis of the shafts 58 and 59, respecting axle 1, and the wheels 4 rotate on an axis common to the axis of the shafts 58 and 59, respecting axle 2.

The foregoing arrangement of the bearing members 15 and trunnions 17 enables me to arrange the driving means interconnecting the driving mechanism on the supporting member and the differential gearing on the axles and comprising the shaft sections 61, 24, 27a and 60, 22, 26a in such a manner that said shaft sections 61, 24 and 60, 22 are coaxial with the pivotal connection of the respective bearing member 15 and trunnion 17, and in such a manner that the common axis of said shaft sections, 61, 24, 27a, 26a, 22, 60 passes through the axial centers of the axles 1 and 2. Again, more particularly stated, the arrangement of the shaft sections 61, 24, 27a and 60, 22, 26a is such that their common axis intersects the axes of the shafts 58 and 59 respecting both axles 1 and 2.

In the preferred arrangement just described and shown in the drawings, it is evident that whenever the axles 1 or 2 are canted so that either end of either of the axles is caused to be raised or lowered in a vertical plane relative to the body supporting member 10, there will be no distortion or misalinement of the shaft sections 61, 24 and 27a interconnecting the drive mechanism of the body member with the differential gearing of the axle unit 2. Likewise, under such conditions there will be no distortion or misalinement of the shaft sections 60, 22 and 26a interconnecting the drive mechanism of the body member with the differential gearing of the axle unit 1. When either of the axles is canted so that either end thereof is raised or lowered in a vertical plane relative to the body supporting member, the axle under such conditions in reality rotates about the trunnion 17 with which it is swivelly connected by its respective bearing member 15, and since the axis of rotation of the shaft sections 61, 24, 27a is coaxial with the axis of rotation of the rear axle 2 during canting movement thereof, said shaft sections will never be distorted or misalined and will always remain properly alined during such canting movement of the rear axles. The same is, of course, true with respect to the shaft sections 60, 22, 26a under a condition of canting movement of the front axle 1. In other words, in the preferred arrangement, the shaft sections 61, 24, 27a, 26a, 22, 60 always remained axially aligned on a common axis regardless of the changing positions of the axles 1 and 2 relative to the supporting member 10.

I provide a novel method of mounting the rotating platform 11 upon the supporting member 10 which I find to be highly advantageous. The structure shown in the drawings avails of both ball bearings and what I call hook-under rollers for the mounting of the rotating platform 11 upon the supporting member 10. According to the embodiment of my invention illustrated herein, the rotating platform 11 is supported relative to the supporting member 10 upon ball bearings, and a plurality of adjustable hook-under roller members are provided on the platform 11 for cooperation with a part of the supporting member 10 to prevent separation of the platform from said supporting member while enabling the platform to rotate relatively to the supporting member.

As shown in the drawings, the upper edge of the supporting member 10 is provided with annular groove 10a, and secured to the under edge of the platform 11 is a ring 66 likewise provided with a similar corresponding annular groove 66a. These grooves 10a and 66a provide a race for ball bearings 67 which are provided in the groove 10a so that the weight of the platform 11 is rotatively supported on said balls.

The supporting member 10 is provided with an annular flange 68 and there are provided at the under side of the platform 11 a plurality of spaced rollers 69 mounted on the stub-shaft 70 journaled in angle brackets 71 secured to the underside of the platform 11 by suitable bolts 72. These rollers 69 are adapted to engage the under edge of the annular flange 68 so as to secure the platform 11 rotatively to body supporting member 10 or, in other words, to prevent separation of the parts 11 and 10 while permitting relative rotation thereof. The angle brackets 71 are preferably provided with elongated slots 73 through which the securing bolts 72 pass into the under side of the platform 11.

The purpose of providing the elongated slots in the angle brackets 71 is to provide for adjustment of the rollers 69 inwardly toward the body supporting member 10 to take up for wear. It will be noted that the under side of the flange 68 is tapered upwardly outwardly, and the rollers 69 are each provided with a correspondingly tapered or conical periphery. As the rollers 69 and flange 68 wear in use, the resulting play may be taken up or eliminated by loosening the bolts 72 and moving the bracket 71 relatively to bolts 72 by reason of the elongated slot 73, so that the rollers 69 more closely engage the tapered under edge of the flange 68.

Any desired number of the hook-under roller members each comprising a bracket 71 and a roller 69 mounted on a stub-shaft 70 journaled in said bracket may be availed of, but I find that the use of four of such members provided on the platform 11 so as to cooperate with the supporting member 10 at points equally spaced therearound is quite satisfactory.

Each of the brackets 71 has its upper leg 71a provided with a groove 71b extending in the direction of the axis of rotation of the roller 69 relative to its bracket 71. In this groove 71b is guidingly received one of the bars 74 which are welded to the bottom of the platform 11 and radially disposed relative to the center of rotation of the platform 11 respecting the supporting member 10. The provision of the radially disposed bars 74 cooperating with the grooves 71b of their respective brackets 71 serves to guide the brackets radially relative to the center of rotation of the platform 11 respecting the supporting member 10 for proper adjustment of the roller members relative to the flange 68.

It will be noted that the means for rotatively mounting the platform 11 relative to the supporting member 10, just described, eliminates the necessity for a center pin such as commonly used in similar types of crane constructions wherein the crane body or superstructure is adapted to rotate relative to the supporting structure. The provision of my invention for adjustability of the roller members to take up play caused by wear of the parts functions to center the platform 11 rotatively relative to the base and eliminates the need for a center pin to center the relatively rotating parts, which center pin would otherwise be required were it not for the adjustability of the roller members of my construction to take up for wear.

My construction for mounting the platform rotatively relative to the supporting member also has advantages in reference to ease of assembly of the rotating member 11 relative to the supporting member 10 by reason of the fact that the ball bearings 67 may be emplaced in the annular groove 10a, the body 11 then placed in supporting position upon the ball bearings, and then the bracket 71 carrying the roller members 69 may afterwards be bolted in position and properly adjusted for cooperation with the flange 68. The bolts 72 for adjustment of the roller members are readily accessible for adjustment of the brackets carrying the same, as will be apparent.

The brake appliances for the front and rear wheels are generally diametrically illustrated in Figure 3, similar appliances likewise operating the brakes for the wheels 4. The conduit 63 is supported near the wheels 3 by a suitable bracket 75 and the elbow 76 is provided to connect the conduit to a fluid piston mechanism 77 by a short conduit. Suitable plungers 79 may be operated in the usual manner whereby fluid pressure entering the mechanism 11 will cause expansion action of the plungers, same being connected to the brake shoes 78 operating against the interior of a brake drum 80. The mechanism just described is of well known construction and forms no part of the present invention.

Having thus described my invention, what I claim as new and desire to secure by Letters Patent of the United States is:

1. In a vehicle structure of the class described, in combination, front and rear axle and wheel units, frame or chassis means connecting said units comprising side frame members having universal joint connections at the ends thereof with the axle and wheel units, one of said axle and wheel units being equipped with transmission gearing intermediate its ends for driving the wheels thereof, a body supporting member, bearing means intermediate the side frame members and the side portions of the body supporting member, longitudinally disposed bearing means intermediate the body supporting member and said transmission equipped axle and wheel unit, drive mechanism carried by the body supporting member, and drive shaft means intermediate said drive mechanism and the transmission gearing of said axle and wheel unit, said drive shaft means being disposed coaxial with the bearing means between the body supporting member and the transmission equipped axle and wheel unit.

2. In a vehicle structure of the class described, in combination, running gear comprising front and rear transmission gear equipped axle and wheel units, side frame members having universal joint connections with said front and rear axle and wheel units and spaced apart so as to be connected near the ends of the axle and wheel units, a body supporting member, bearing means intermediate the front and rear portions of the body supporting member and the front and rear axle and wheel units, respectively, side bearing means intermediate the side portions of the body supporting member and the side frame members, drive mechanism on the body supporting member, and longitudinal drive shaft means connecting said drive mechanism with the transmission mechanism of the front and rear axle and wheel units, said drive shaft means being disposed longitudinally of the vehicle and coaxial with the bearing means intermediate the front and rear ends of the body supporting member and the front and rear axle and wheel units.

3. In a vehicle structure of the class described, in combination, running gear comprising front and rear transmission gear equipped axle and wheel units, side frame members having universal joint connections with said front and rear axle and wheel units and spaced apart so as to be connected near the ends of the axle and wheel units, a body supporting member, bearing means intermediate the front and rear portions of the body supporting member and the front and rear axle and wheel units, respectively, side bearing means intermediate the side portions of the body supporting member and the side frame members, drive mechanism on the body supporting member, and longitudinal drive shaft means connecting said drive mechanism with the transmission mechanism of the front and rear axle and wheel units, said drive shaft means being disposed longitudinally of the vehicle and coaxial with the bearing means intermediate the front and rear ends of the body supporting member and the front and rear axle and wheel units, said drive shaft means comprising drive shaft sections and universal joint connections therebetween.

4. In a vehicle structure of the class described, in combination, front and rear axle and wheel units, side frame members, universal joint connections between the front and rear ends of the frame members and the front and rear axle and wheel units, respectively, a body supporting member, bearing means intermediate the sides of the body supporting member and the said frame members, other bearing means intermediate the front and rear portions of the body supporting member and the front and rear axle and wheel units, respectively, transmission gearing carried by one of said axle and wheel units, drive mechanism on the body supporting member, and drive shaft means intermediate said drive mechanism and said transmission gearing disposed coaxial with the bearing means intermediate the body supporting member and the axle and wheel unit equipped with said transmission gearing.

5. In a vehicle structure of the class described, in combination, front and rear axle and wheel units, side frame members, universal joint connections between the front and rear ends of the frame members and the front and rear axle and wheel units, respectively, a body supporting member, bearing means intermediate the sides of the body supporting member and the said frame members, other bearing means intermediate the front and rear portions of the body supporting member and the front and rear axle and wheel units, respectively, transmission gearing carried by one of said axle and wheel units, drive mechanism on the body supporting member, and drive shaft means intermediate said drive mechanism and said transmission gearing disposed coaxial with the bearing means intermediate the body supporting member and the axle and wheel unit equipped with said transmission gearing, in which the drive shaft means comprises drive shaft sections on the body supporting member and on the transmission equipped axle and wheel unit, and universal joint connecting means between said sections of the drive shaft means.

6. In a vehicle structure of the class described, in combination, a body supporting member, a chassis comprising side frame members and front and rear axle and wheel units, side bearing means intermediate the sides of the body supporting member and the side frame members and connected with the latter intermediate the ends of the same, bearing arms projecting from the front and rear axle and wheel units and equipped with bearings disposed on the longitudinal axis of the vehicle, bearing means on the body supporting member cooperating with the last mentioned bearings, drive mechanism on the body supporting member and driving means intermediate said drive mechanism and the axle and wheel units and disposed coaxially with the cooperating bearings between the body supporting member and the front and rear axle and wheel units.

7. In a vehicle structure of the class described, in combination, a body supporting member, a chassis comprising side frame members and front and rear axle and wheel units, side bearing means intermediate the sides of the body supporting member and the side frame members and pivotally connected with the latter intermediate the ends of the same, and a pivotal connection between one of the axle and wheel units and the body supporting member, said pivotal connection having its axis disposed longitudinally of the frame members and intersecting the axes of the wheels of said front and rear axle and wheel units, drive mechanism on the body supporting member and driving means intermediate said drive mechanism and one of said axle and wheel units and disposed on an axis common to the axis of said pivotal connection.

8. In a vehicle structure of the class described, in combination, a body supporting member, a chassis comprising side frame members and front and rear axle and wheel units, side bearing means intermediate the sides of the body supporting member and the side frame members and pivotally connected with the latter intermediate the ends of the same, and a pivotal connection between one of the axle and wheel units and the body supporting member, one of said axle and wheel units being equipped with transmission gearing intermediate its ends and drive means intermediate said transmission gearing and the wheels of said unit for driving the same, said pivotal connection having its axis disposed longitudinally of the frame members and intersecting the axis of said drive means, drive mechanism on the body supporting member, and driving means intermediate said drive mechanism and said transmission gearing and disposed on an axis common to the axis of said pivotal connection.

9. In a vehicle structure of the class described, in combination, a body supporting member, a chassis comprising side frame members and front and rear axle and wheel units, side bearing means intermediate the sides of the body supporting member and the side frame members and pivotally connected with the latter intermediate the ends of the same, pivotal connections intermediate the front and rear portions of the body supporting member and the front and rear axle and wheel units respectively, said pivotal connections having a common axis disposed longitudinally of the frame members and intersecting the axes of the wheels of said front and rear axle and wheel units, each of said axle and wheel units being equipped with transmission gearing intermediate the ends of said units, and drive means intermediate the transmission gearing and the wheels of each unit, the drive means for each axle and wheel unit being disposed on an axis common to the axis of the wheels of said unit, drive mechanism on the body supporting member, driving means intermediate said drive mechanism and the transmission gearing for the front axle and wheel unit and disposed coaxial with the pivotal connection intermediate the front portion of the body supporting member and the front axle unit, and driving means intermediate said drive mechanism and the transmission gearing for the rear axle and wheel unit and disposed coaxial with the pivotal connection between the rear portion of the body supporting member and the rear axle and wheel unit.

10. In a vehicle structure of the class described, in combination, running gear comprising front and rear transmission gear equipped axle and wheel units, side frame members having universal joint connections with said front and rear axle and wheel units and spaced apart so as to be connected near the ends of the axle and wheel units, a body supporting member, bearing means intermediate the front and rear portions of the body supporting member and the front and rear axle and wheel units, respectively, side bearing means intermediate the side portions of the body supporting member and the side frame members, drive mechanism on the body supporting member, longitudinal drive shaft means connecting said drive mechanism with the transmission mechanism of the front and rear axle and wheel units, said drive shaft means being disposed longitudinally of the vehicle and coaxial with the bearing means intermediate the front and rear ends of the body supporting member and the front and rear axle and wheel units, the drive mechanism on the body supporting member comprising a hollow vertical drive shaft, steering mechanism on one of the axle and wheel units, a steering shaft received in the said hollow vertical drive shaft and operably connected at its lower end with the steering mechanism of said axle and wheel unit, and means connected with the upper end of the steering shaft to actuate the same manually.

11. A vehicle structure as claimed in claim 10 wherein said steering shaft is also of hollow construction, combined with a fluid pressure conduit passing through the steering shaft from its upper end to its lower end and arranged so that fluid pressure in said conduit may be caused to act on brake instrumentalities for one or both of the brake and wheel units.

12. In a vehicle structure of the class described, in combination, a body supporting member, a chassis comprising side frame members and front and rear axle and wheel units, side bearing means intermediate the sides of the body supporting member and the side frame members and connected with the latter intermediate the ends of the same, a yoke member having spaced apart connections with one of said front and rear axle and wheel units and projecting therefrom, the said yoke member being equipped with bearings disposed on the longitudinal axis of the vehicle, bearing means on the body supporting member cooperating with the last mentioned bearings, drive mechanism on the body supporting member and drving means intermediate said drive mechanism and the said one of said axle and wheel units and disposed coaxially with the cooperating bearings between the body supporting member and said yoke member.

13. A vehicle as claimed in claim 12, wherein the yoke member comprises a substantially Y shaped member and the spaced apart connections include means for fastening the ends of the divergent arms of said member to the said one wheel and axle unit, the single branch of said member being provided with the bearings adjacent its end engaging the bearing means on the body supporting member.

14. In a vehicle structure of the class described, in combination, a body supporting member, a chassis comprising side frame members and front and rear axle and wheel units, side bearing means intermediate the sides of the body supporting member and the side frame members and connected with the latter intermediate the ends of the same, a yoke member havinging spaced apart connections with one of said front and rear axle and wheel units and projecting therefrom, the said yoke member being equipped with bearings disposed on the longitudinal axis of the vehicle, bearing means on the body supporting member cooperating with the last mentioned bearings, drive mechanism on the body supporting member and driving means intermediate said drive mechanism and the said one of asid axle and wheel units and disposed coaxially with the cooperating bearings between the body supporting member and said yoke member, said one axle and wheel unit being equipped with transmission gearing driven by said driving means.

15. A vehicle as claimed in claim 14, wherein the spaced apart connections are at opposite sides of the transmission gearing.

16. A vehicle as claimed in claim 12 wherein transmission gearing is a part of said one axle and wheel unit, a housing surrounds said gearing, and the spaced apart connections include means for fastening the yoke member to the housing, at opposite sides of the gearing.

JOHN D. RAUCH.